(12) United States Patent
Beatty et al.

(10) Patent No.: US 8,818,961 B1
(45) Date of Patent: *Aug. 26, 2014

(54) USER RESTORATION OF WORKFLOW OBJECTS AND ELEMENTS FROM AN ARCHIVED DATABASE

(75) Inventors: Louis Beatty, Ormond, FL (US); Steven R. DeVos, Kirkland, WA (US)

(73) Assignee: Symantec Corporation, Mountain View, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/610,246

(22) Filed: Oct. 30, 2009

(51) Int. Cl.
*G06F 17/30* (2006.01)

(52) U.S. Cl.
USPC ........................................................ 707/685

(58) Field of Classification Search
CPC .................................................... G06Q 10/06
See application file for complete search history.

(56) References Cited

U.S. PATENT DOCUMENTS

| | | |
|---|---|---|
| 5,276,860 A | 1/1994 | Fortier et al. |
| 5,535,381 A | 7/1996 | Kopper |
| 5,555,371 A | 9/1996 | Duyanovich et al. |
| 5,559,991 A | 9/1996 | Kanfi |
| 5,835,953 A | 11/1998 | Ohran |
| 5,991,542 A | 11/1999 | Han et al. |
| 6,029,168 A | 2/2000 | Frey |
| 6,085,298 A | 7/2000 | Ohran |
| 6,101,585 A | 8/2000 | Brown et al. |
| 6,360,330 B1 | 3/2002 | Mutalik et al. |
| 6,366,987 B1 | 4/2002 | Tzelnic et al. |
| 6,542,962 B2 | 4/2003 | Kodama et al. |
| 6,640,278 B1 | 10/2003 | Nolan et al. |
| 6,665,815 B1 | 12/2003 | Goldstein et al. |
| 6,714,952 B2 | 3/2004 | Dunham et al. |
| 6,829,688 B2 | 12/2004 | Grubbs et al. |
| 6,847,983 B2 | 1/2005 | Somalwar et al. |
| 6,865,655 B1 | 3/2005 | Andersen |

(Continued)

FOREIGN PATENT DOCUMENTS

EP 838758 4/1998

OTHER PUBLICATIONS

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

(Continued)

*Primary Examiner* — Dinku Gebresenbet
(74) *Attorney, Agent, or Firm* — Rory D. Rankin; Meyertons, Hood, Kivlin, Kowert & Goetzel, P.C.

(57) ABSTRACT

A system and method for restoring data including a workflow from an archived copy of a database file. The method includes receiving a request to restore a workflow from an archived copy. The workflow comprises attributes describing a sequence of conditions and actions corresponding to an item and comprises a history log. The item may comprise an electronic document and associated context information describing the document in an intranet portal application environment. The associated context information includes an identifier corresponding to the workflow. The method includes retrieving records comprising the workflow attributes from the archived copy. The method further includes generating from the retrieved records a workflow metadata file comprising tagged elements corresponding to the workflow attributes and history log. Then the method stores the workflow metadata file in a file system. The method further includes restoring the workflow to the intranet portal application via the file system.

12 Claims, 10 Drawing Sheets

(56) References Cited

U.S. PATENT DOCUMENTS

| | | | |
|---|---|---|---|
| 6,880,051 | B2 | 4/2005 | Timpanaro-Perrotta |
| 6,910,112 | B2 | 6/2005 | Berkowitz et al. |
| 6,938,135 | B1 | 8/2005 | Kekre et al. |
| 6,976,039 | B2 | 12/2005 | Chefalas et al. |
| 7,149,858 | B1 | 12/2006 | Kiselev |
| 7,290,017 | B1 | 10/2007 | Wang et al. |
| 7,290,101 | B1 | 10/2007 | Kekre et al. |
| 7,389,314 | B2 | 6/2008 | Kulkarni et al. |
| 7,549,032 | B1 | 6/2009 | Kekre et al. |
| 7,596,713 | B2 | 9/2009 | Mani-Meitav et al. |
| 7,617,414 | B2 | 11/2009 | Becker et al. |
| 7,672,934 | B1 | 3/2010 | Beatty et al. |
| 8,060,474 | B2 | 11/2011 | Beatty et al. |
| 8,065,278 | B2 | 11/2011 | Beatty et al. |
| 2002/0129042 | A1* | 9/2002 | Bradshaw et al. ............ 707/200 |
| 2003/0163495 | A1 | 8/2003 | Lanzatella et al. |
| 2003/0177149 | A1 | 9/2003 | Coombs |
| 2004/0243928 | A1 | 12/2004 | Hesmer et al. |
| 2004/0267839 | A1 | 12/2004 | Mendonca et al. |
| 2004/0268068 | A1 | 12/2004 | Curran |
| 2005/0138087 | A1 | 6/2005 | Beck et al. |
| 2006/0041556 | A1 | 2/2006 | Taniguchi et al. |
| 2006/0230116 | A1 | 10/2006 | Couper et al. |
| 2007/0266368 | A1* | 11/2007 | Szpak et al. ................. 717/105 |
| 2008/0307000 | A1 | 12/2008 | Paterson et al. |
| 2009/0210427 | A1 | 8/2009 | Eidler et al. |

OTHER PUBLICATIONS

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

\* cited by examiner

USER RESTORATION OF WORKFLOW OBJECTS AND ELEMENTS FROM AN ARCHIVED DATABASE

BACKGROUND OF THE INVENTION

1. Field of the Invention

This invention relates to the field of computer processing and, more particularly, to electronic documents management.

2. Description of the Related Art

As computer memory storage and data bandwidth increase, so does the amount and complexity of data that business and industry manage each day. A large portion of the data that may be managed in an enterprise involves content managed for a company or workgroup by a dedicated server, such as an enterprise information portal, which provides employees and customers the ability to search and access corporate information, including electronic documents, announcements, task, discussion topic, etc., that may be organized as lists of items. The enterprise information portal may serve as the gateway to log into the corporate network and retrieve electronic documents. It is noted that enterprise information portals are typically secure and private (also known as intranet portals), but also may include external gateways for wider or even public access.

An enterprise information portal often includes a back-end database system, which may serve as a document management system. The back-end database system may store data in the form of electronic documents, metadata, and/or other content associated with the portal, such as web pages. The back-end database in an enterprise information portal may be a variant of a stand-alone database system, which has been configured for document and content management. For example, the stand-alone database system may be used to store valuable business information.

Application logic may be attached to documents or items in these lists. For example, a sequence of conditions and actions may be attached to an item, a list, or a library. In various embodiments, such a sequence may be referred to as a "workflow". Workflows may be used to manage a policy, or flow, of how work should be performed and assigned, in order to free a team to focus on the work itself. For example, a team may focus on drafting and reviewing contracts, whereas the predetermined workflow application logic may handle the sending of email notifications, the moving of documents to predetermined locations based upon the status of those documents, collecting data from specified users, logging history information, or otherwise.

Because electronic documents frequently contain crucial information, the contents of electronic document servers (e.g., an enterprise information portal along with its back-end database) may be archived, or backed up, to an archival storage to prevent loss or corruption of data. In particular, a back-end database is often backed up as a single, monolithic database file, which contains all the tables, records, and indexing information for the database. The workflow information may be included in these records and tables.

When a user wants to restore one or more items or lists and accompanying workflow information to the portal, the single database file may be reinstalled as a target of the portal. Unfortunately, reinstallation of a large, monolithic database may be time-consuming and inefficient when restoration of only a small number of items or lists is desired. There may also be occasions when a user desires the portal to be able to access an item in a raw file format rather than as a portal item or list. Further, there may be occasions when a user desires to have an application other than the portal access an electronic document, announcement, task, discussion topic, etc. Also, associated workflow information may not be tightly coupled to the items, lists, or libraries. Workflows determined to be associated with the requested items or lists may have multiple attributes and history logs stored in records that may not be easily distinguished from other items or lists.

In view of the above, it would be desirable to restore individual data objects including accompanying workflows from an archived database file without having to reinstall the database system and in a format that is accessible to either an enterprise information portal or another application.

SUMMARY OF THE INVENTION

Systems and methods for restoring data including a workflow from an archived copy of a database file are contemplated. In one embodiment, a method includes receiving a request to restore a workflow from the archived copy of the database file. In various embodiments, the request to restore a workflow may be generated in response to a request to restore a particular item or file that is associated with the workflow. A workflow may comprise a plurality of workflow attributes describing a sequence of predetermined steps for managing one or more corresponding items in a intranet portal application environment. The item may comprise a file, which may be an electronic document, and associated context information describing the file in an environment that is specific to the first intranet portal application. The associated context information may include an identifier (ID), or tag, corresponding to the workflow.

The method further includes retrieving one or more records comprising the workflow attributes from the archived copy of the database file. The method further includes generating from the retrieved records a workflow metadata file comprising tagged elements corresponding to the workflow attributes. Then the method stores the workflow metadata file in a file system. The method further includes restoring the workflow to the intranet portal application via the file system.

In a further embodiment, the sequence of predetermined steps comprises conditions and actions, wherein a first action is taken based on a first resolved state of a condition and a second action is taken based on a different second resolved state of the condition. Also, the workflow may further comprise a workflow history log for each step in said sequence. The history log may correspond to a point-in-time provided in said request. The workflow history log may comprise at least resolved state information of conditions and a list of taken actions

Figure 1:
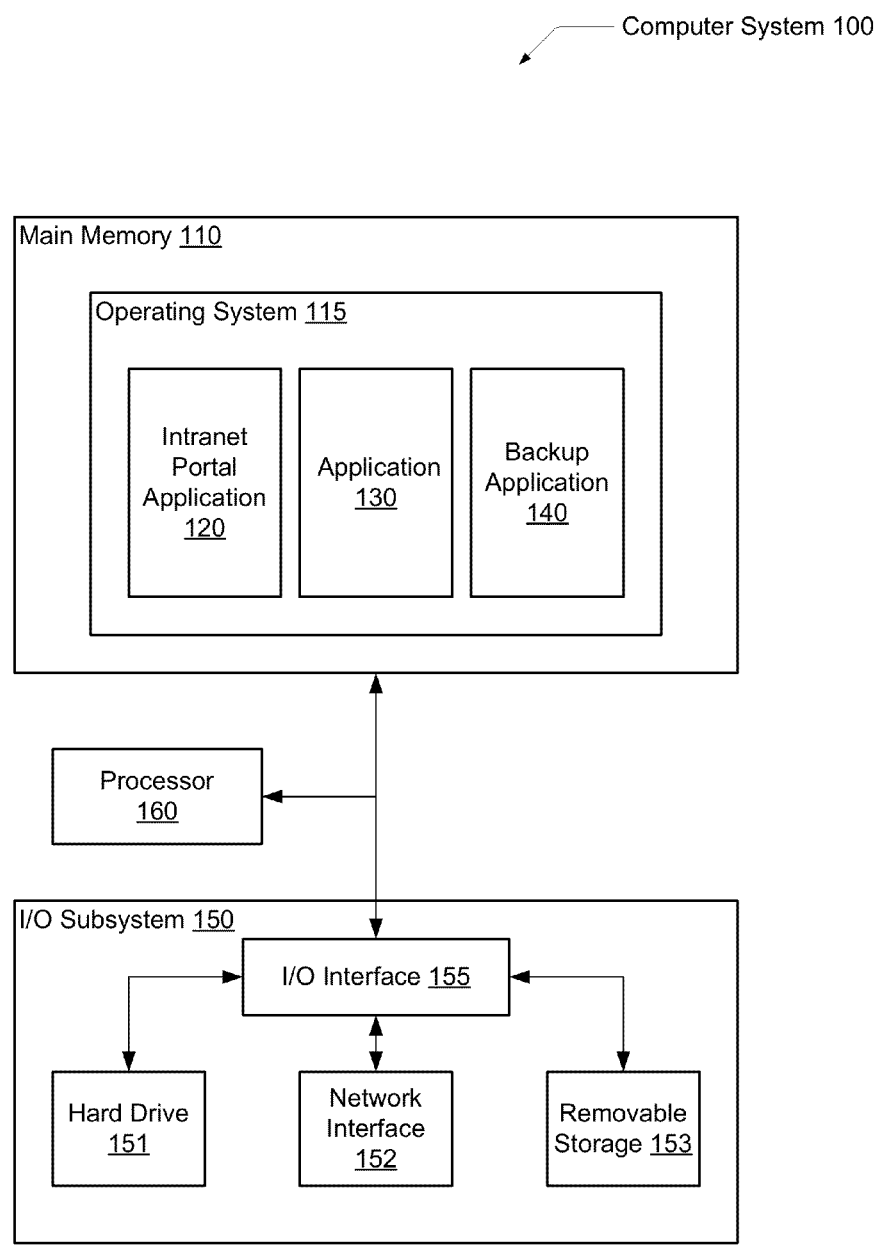
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, a generalized block diagram of one embodiment of a computer system 100 is shown. Computer system 100 includes a processor 160 coupled to a main memory 110. Processor 160 and main memory 110 are in turn connected to an I/O subsystem 150, which comprises an I/O interface 155, a hard disk drive 151, a network interface 152, and a removable storage 153. Computer system 100 may be representative of a laptop, desktop, server, workstation, terminal, personal digital assistant (PDA) or any other type of computer system.

Processor 160 is representative of any of various types of processors such as an x86 processor, a PowerPC processor or a SPARC processor. Similarly, main memory 110 is representative of any of various types of memory, including DRAM, SRAM, EDO RAM, Rambus RAM, etc.

I/O interface 150 is operational to transfer data between processor 160 and/or main memory 110 and one or more internal or external components such as hard disk drive 151, network interface 152 and removable storage 153, as desired. For example, I/O interface 155 may embody a PCI bridge operable to transfer data from processor 160 and/or main memory 110 to one or more PCI devices. I/O interface 155 may additionally or alternatively provide an interface to devices of other types, such as SCSI devices and/or Fibre channel devices.

Hard disk drive 151 may be a non-volatile memory such as a magnetic media. Network interface 155 may be any type of network adapter, such as Ethernet, fiber optic, or coaxial adapters. Removable storage 153 is representative of a disk drive, optical media drive, tape drive, or other type of storage media, as desired.

In addition to the depicted hardware components, computer system 100 may additionally include various software components. For example, FIG. 1 illustrates an operating system 115 stored in main memory 110. Operating system 115 is representative of any of a variety of specific operating systems, such as, for example, Microsoft Windows, Linux, or Sun Solaris. As such, operating system 115 may be operable to provide various services to the end user and provide a software framework operable to support the execution of various programs such as an Intranet Portal application 120, a backup application 140 or any of a variety of other applications represented in the illustrated embodiment by application 130. It is noted that the depicted software components of FIG. 1 may be paged in and out of main memory 110 in a conventional manner from a storage medium such as hard drive 151.

In various embodiments, intranet portal 120 is operable to manage and maintain a plurality of electronic documents for a plurality of system users. In one particular implementation, intranet portal 120 is embodied by a Microsoft SharePoint Server or a similar enterprise information portal program.

Figure 2:
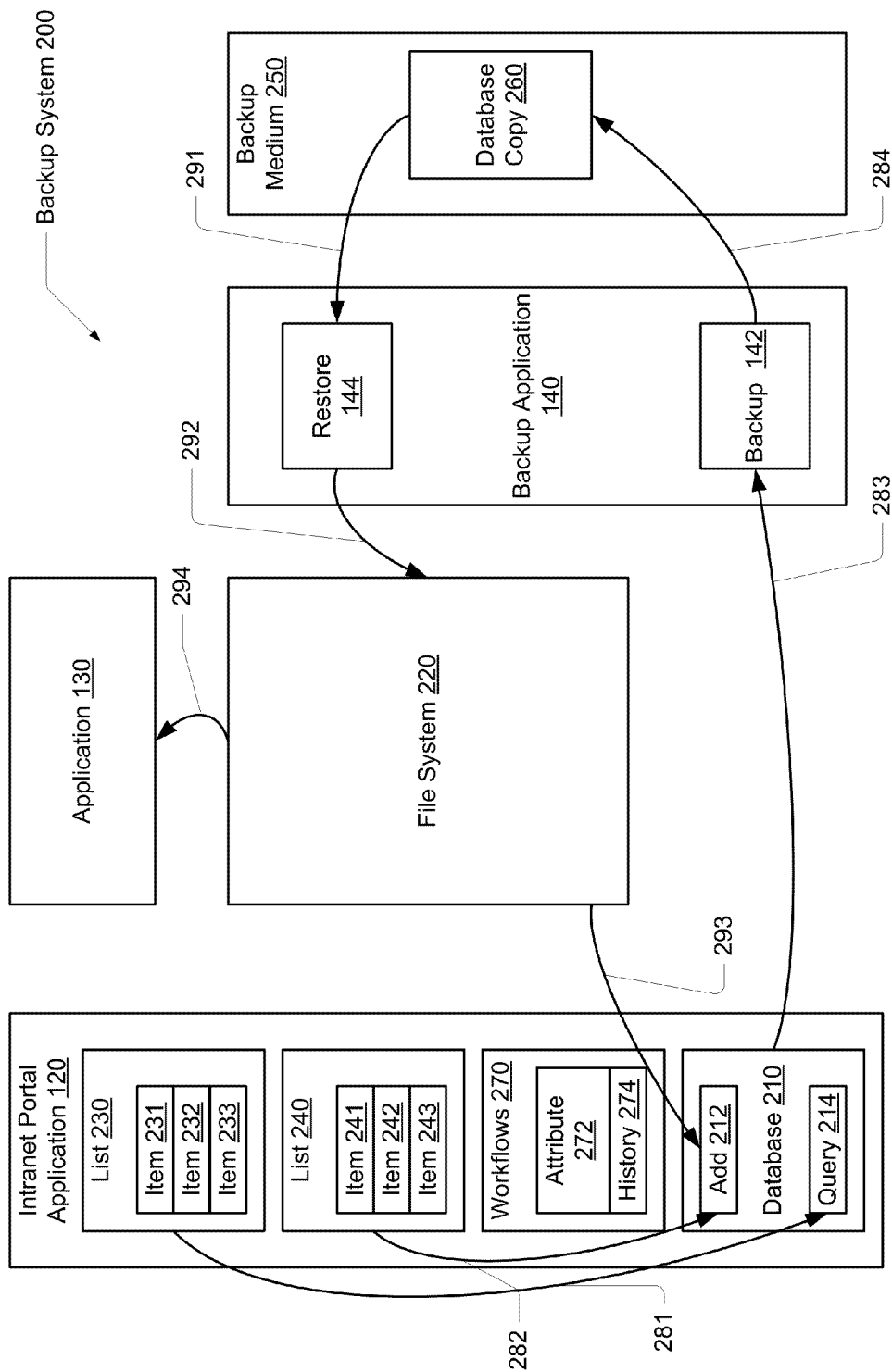
FIG. 2 is a generalized block diagram illustrating one embodiment of a backup system.

Turning now to FIG. 2, a block diagram of one embodiment of a backup system 200 is illustrated. Backup system 200 includes intranet portal 120, application 130, and backup application 140 that may be included in computer system 100 of FIG. 1. Backup system 200 also includes a file system 220 that may be stored within hard drive 151, removable storage 153, or otherwise employed by computer system 100 for data storage. As referred to herein, a "file system" shall mean an information system which references and stores data, hierarchically organized in files and directories, in a volume created on a storage medium. The file system provides access to the data on the storage medium. Backup system 200 may further include a backup medium 250 coupled to backup application 140 that may be used by backup application 140 to store backup datasets.

In one embodiment, intranet portal 120 may manage and organize electronic content as items within lists. As referred to herein, an "item" shall mean a document, announcement, task, discussion topic, or other electronic content that is managed by an intranet portal and a "list" shall mean a logical group of items. In one embodiment, a list comprises two or more items, wherein each item in the list comprises a file of a same file type and associated context information describing the file in a first intranet portal application environment. In addition, as described further below, one or more of the associated context information includes an identifier (ID) of an associated workflow, wherein each ID may be different.

In the illustrated embodiment, intranet portal 120 includes lists 230 and 240. List 230 includes items 231-233 and list 240 includes items 241-243. In one embodiment, each item 231-233 and 241-243 comprises a file and associated context information describing the file in an environment that is specific to intranet portal application 120. The context information may comprise associated attributes of the item. Examples of attributes may include a document title, author of a document, description of a document or file, alternate text specification that is rendered when an image cannot be displayed, location of a document, content type of data expected when downloading the object, or otherwise.

In one embodiment, intranet portal 120 includes workflows 270. Workflows 270 may include attributes 272 and history 274. In one embodiment, attributes 272 and history 274 may provide another manner for intranet portal 120 to manage an item. Before further describing attributes 272 and history 274, an overview of workflows is provided here. As described earlier, a workflow may be a sequence of conditions and actions that may be may be attached to an item, a list, or a library. A workflow may organize and run a series of actions that correspond to a predetermined work process, policy, or flow chart. This process may control any aspect of a list item 231-233 and 241-243 including the life cycle of that item. The workflow may include both actions performed by users and actions performed by the workflow. Users may interact with the workflow through a Tasks list, where a workflow may create a task and remain paused until the task is marked complete.

Workflows may add no-code application logic to applications. A user may create rules that associate conditions and actions with items lists and libraries. Changes to items in lists may trigger actions in a workflow. For example, one responsibility of a team may be writing, revising, and approving contracts. These contracts may be stored in documents, or items, on the team site. A workflow may send a notification e-mail message to a reviewer when a new contract has been uploaded to the site. At the same time, the workflow may create a task in a Tasks list for the reviewer. When that person reviews the contract and marks the task as complete, different actions may be triggered depending on whether the contract is assigned a status of Approved or Rejected. Before continuing with a description of backup system 200, an example of a workflow flow chart is provided here.

Figure 3:
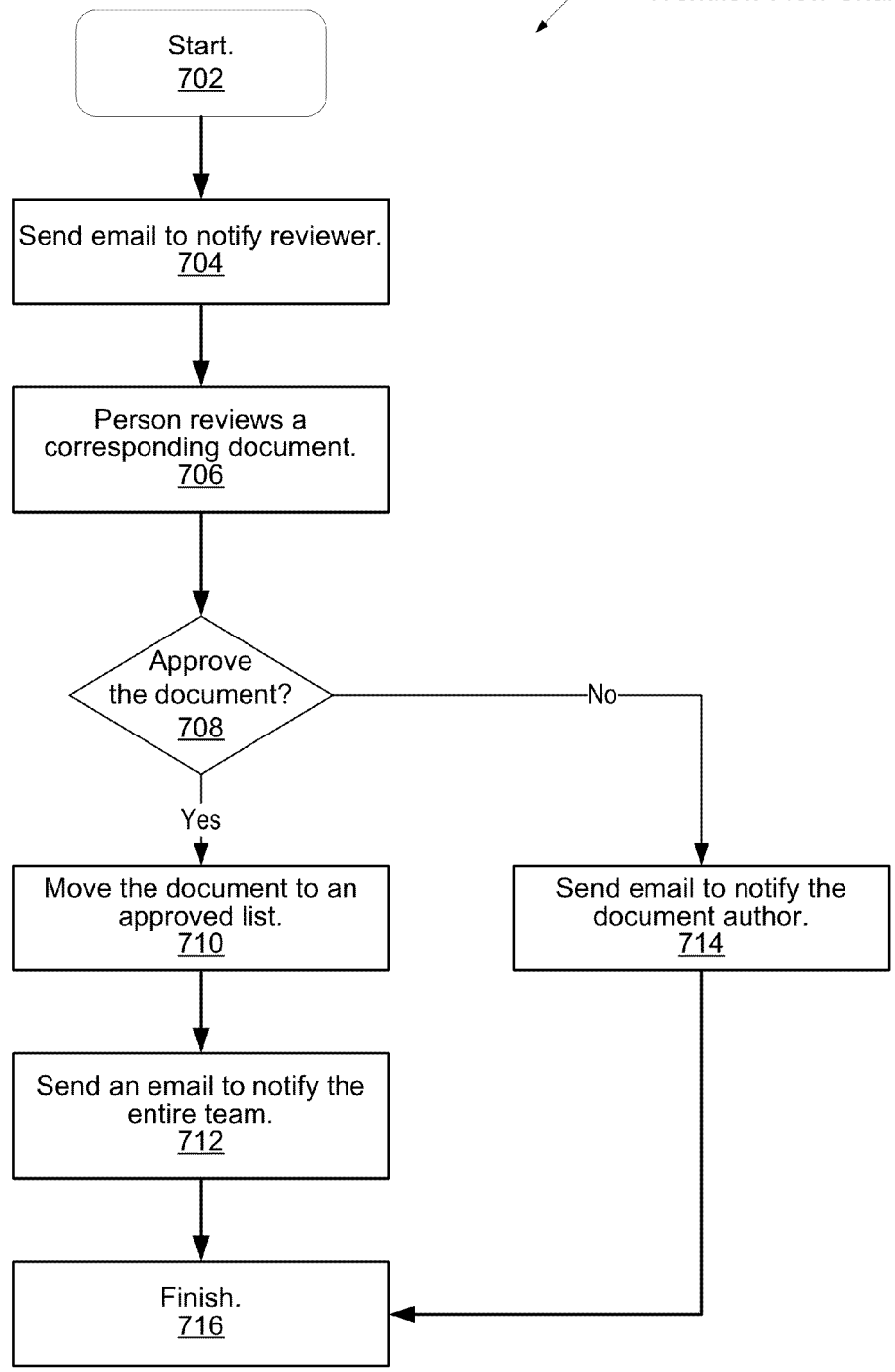
FIG. 3 is a flow diagram illustrating one embodiment of a workflow flow chart.

Referring to FIG. 3, one embodiment of a workflow flow chart 700 is shown. Flow chart 700 may begin at block 702. An event may initiate a workflow. Examples of an event may include an item is created, an item is changed, or a user clicks a start button on a predetermined site. A created workflow may be attached to a list or a library within the site. When a user designs a workflow, the user may choose which list has the workflow attached to it. Then an event in this list starts the workflow.

In block 704, a software application may allow a user to create a workflow that sends a notification e-mail message to a reviewer when a new contract has been uploaded to the site. In one embodiment, at the same time, the workflow may create a task in a Tasks list for the reviewer. Also, a user who creates workflow flowchart 700 may choose to associate multiple actions with one condition. For example, a rule may be created wherein if an item is created by a specific person, then (1) the reviewer may be sent an e-mail, such as in block 704, and (2) workflow information may be logged to a history list. In another embodiment, each action taken within flowchart 700 may be unconditionally logged in a history list. When that person reviews the contract and marks the task as complete in block 706, different actions may be triggered depending on whether the contract is assigned a status of Approved or Rejected.

If the document is approved (conditional block 708), then, in block 710, the document may be moved to an approved list. This action may be recorded in a corresponding history log. Following, in block 712, an email may be sent to an entire team for notification. If the document is rejected (conditional block 708), then, in block 714, an email may be sent to the author of the document for notification. Again, the rejection status may be recorded in a history log along with identification of the reviewer who rejected the document. The flow chart 700 may end at block 716. Team efficiency and productivity may improve because the workflow drives a process so that the team can focus on doing the work, rather than on managing the workflow. In one embodiment, no programming is required to build such a solution.

Returning again to FIG. 2, workflows 270 may include attributes 272 and history 274. Similar to lists and items, a workflow has attributes. In contrast to lists and items, a workflow has an additional history. In one embodiment, a separate attributes 272 and history 274 pair may exist for each pre-defined workflow. Attributes 272 may include user-defined conditions, events, and actions as described within a flow chart.

A user may build workflows to automate common business processes by using a declarative, rules-based, code-free workflow editor. One example of such an editor is Microsoft Office SharePoint Designer 2007. Then a number of provided built-in workflow actions and workflow conditions may be incorporated in user-defined workflows. As used herein, "schema" refers to the data structure of a database file. Schema action elements may contain information for a workflow engine to process a workflow activity, such as sending e-mail notifications, updating list items, creating and assigning tasks, checking items in or out, collecting data from a participant that may be referenced later in the workflow, pausing or stopping the workflow, logging workflow information to a History list to use for repudiation or workflow debugging, setting workflow variables, performing calculations, as well as many other activities.

In one embodiment, examples of attributes associated with schema action elements may include a name attribute that represents a description of the action, a .NET assembly name attribute that contains instructions to implement the action, a createtasks attribute that creates a task list item in the workflow, a parallel attribute that joins other designated action elements to be executed in parallel, or otherwise.

Schema condition elements may contain information for a workflow engine to evaluate whether a workflow action should be taken or if an action is required. Each condition element may correspond to a Boolean method inside a specified workflow library. These Boolean methods may be used to evaluate values passed by their parameters and return either true or false. Therefore, a condition element may be used to create rules for establishing a condition where the workflow performs an associated action only if that condition is true. In one embodiment, a condition element may contains information about a .NET assembly where the condition code is implemented, as well as the parameters that are required to make a function call. A condition element may also contain information about how a condition statement may be displayed to the workflow editor. In one embodiment, examples of associated attributes may include an applies to attribute that indicates whether a condition statement is to be shown or hidden, an assembly attribute that indicates the .NET assembly that contains the implementation code for the corresponding condition element, phrase attributes that provide logic such as And, Or, Not, Else, or When; or otherwise.

History 274 may include information that provides an electronic "paper trail" to document the flow of information in an organization such as which user approved a particular document and what is the last completed step or block in a flow chart. As described above regarding schema action elements, one provided action may call a Log to History List when a user wishes to keep a record of the workflow history for investigating errors or for tracking and repudiation purposes. When a user creates a workflow that uses this example of an action (Log to History List), a corresponding list may be automatically created. This list may have columns for such information as user ID, date, event, and error description. In addition, history 274, which may be a list, may contain many system identifiers (IDs) that point back to various lists, workflow definitions, and documents, along with the actions, user names, event dates, descriptions, and outcomes. This list may contain the underlying data that, in the event of an audit, may be used to piece back together a complete workflow history. A custom web part may utilize this list to display the various workflow events in a user-readable format, such as a graphics format.

It is noted the steps of a workflow flowchart 700 may not be updated each time a document is saved. Tracking the various saved versions of a document may be performed by a versioning system. When a user wishes to apply a chosen workflow to a particular document, a tag, or policy, identifier (ID) may associate the document to the workflow. This association mechanism is similar to the mechanism for associating documents to lists. A record within a table corresponding to both the particular document and the chosen workflow may be updated when a document is published and not simply saved. Publishing the document may make the document visible to one or more other users and a subsequent action may occur, such as an approval or rejection process. The updated record may include an update of a status of the steps or blocks of a workflow flowchart 700. For example, a document publishing step may correspond to workflow flowchart 700 moving from conditional block 708 to block 710. It is further noted that lists 230 and 240 are tightly coupled to items 231-233 and 241-243. In contrast, workflows 270 are loosely coupled to these items and may exist on their own. For example, a user may define a particular workflow, but the workflow may not yet be associated to any items.

In the illustrated embodiment, intranet portal 120 may also include an encapsulated version of a database 210 for storing lists, items, and workflows. In one embodiment, intranet portal 120 may be configured to be the 'user' of database 210. In one embodiment, database 210 is embodied by Microsoft SQL Server or a similar database server system. It is further noted that one or more client computers (not shown in FIG. 1) may be coupled via a network to computer system 100. The client systems may access the intranet portal 120 centrally via one or more web pages, including access to database 210.

Database 210 represents both a database program and one or more actual databases implemented therein (not shown in FIG. 2). The database program refers to the executable commands, user interfaces and other program code for operating database 210. The databases included in database 210 may further include various tables, indexes, relationships, queries, stored procedures, file systems, security layers, networking interfaces, etc., which are configured to operate on a plurality of data records, also referred to as records or entries, that constitute the "database."

In one embodiment in which database 210 is a relational database, the records may be arranged in tables (row and column arrangement). The term "record" as used herein shall refer to an entry in a database. A collection of associated records may be collectively described as a "table" in the database. A record may consist of one or more fields, which may serve as indexes (or keys) to other records in other tables. For example, in a document management database, each record in a document table may represent a document (or data object) stored in the database. In one embodiment, the document (data object) may be stored in the fields of the record itself. In some embodiments, the document (data object) may be represented in a record by a reference to the document, such as a memory location. In addition, database 210 may create and modify a mounted database file (not shown in FIG. 2) for storing and accessing any given implementation of a relational database. In some embodiments, database 210 executes on a dedicated computing system that is configured for access by other server and client computers via a communications network.

As used herein, "relational database management system" (RDBMS) shall refer to the executable code and program instructions for creating, storing and accessing one or more databases, and may include a file system and user interface components in various embodiments. A relational database conforms to the relational data model. In contrast, an object-oriented database represents information in the form of objects. RDBMSs are well known in the computer arts, some common examples including: Oracle (Oracle Corp.), MS-Access (Microsoft Corp.), SQL Server (Microsoft Corp.), Adaptive Server Anywhere (Sybase, Inc.), Informix (IBM Corp.), InterBase (Borland Software Corp.), Ingres (Ingres Corp.), MySQL (MySQL AB), MaxDB (SAP AG, MySQL AB), Apache Derby (Apache), etc. Furthermore, as used herein a "secured RDBMS" shall refer to an RDBMS that is configured to load and secure a database file (i.e., locking). It is noted that from the above list or RDBMSs, MS-Access is not a secured RDBMS because MS-Access does not support database locking.

Accordingly, a "mounted" or "locked" database file shall refer herein to a database file that has been loaded and secured. Thus, access to a mounted database file is performed via the secured RDBMS that has mounted the database file. After a database file has been mounted, it may be opened, i.e., brought online, for access via the secured RDBMS by authorized users and client systems. It is noted that a mounted database file may be inaccessible ("offline") if it is not yet open. A mounted database file is also referred to as a "started" database file. Thus, until a database file has been mounted, it cannot be accessed by a secured RDBMS.

In contrast, an "unmounted" database file refers to a database file that is not loaded and secured for access by a secured RDBMS. An unmounted database file may be accessed as a file according to user or file privileges, or other attributes, as defined by the file system in which it is stored. An example of an unmounted database file is a copy of a mounted database file. This copy is identical in content to the mounted database file, but cannot be accessed by the secured RDBMS that created the mounted database file. In some embodiments, a mounted database file is taken offline and then backed up to an unmounted copy. With this procedure, the state of the mounted database file does not change during the backup process, which results in an identical and consistent unmounted copy of the database file.

In particular, database 210 is shown in FIG. 2 to include two functions, query 214 and add 212. These functions are shown as an example of functionality included within a relational database. In various embodiments, other kinds of functions, store procedures, or programs may be executed in a relational database. The query function 214 represents a function used to retrieve information from database 210, whereas the add function 212 represents a function to store information in database 210. It is noted that the query 214 and 212 functions may operate on data related to the relational database program or on data from any of the databases implemented therewith in a given instance of database 210.

In one embodiment, the query function 214 may be accessed via interface 281, while the add function is shown with access via interface 282. For example, as shown, intranet portal 120 may query database 214 via interface 281 to retrieve one or more of items 231-233 in list 230. Each of these items 231-233 may or may not be associated with a workflow defined in workflows 270. Further, intranet portal 120 may access add function 212 via interface 282 to store in database 214 one or more of items 241-243 of list 240. Again, each of these items 231-233 may or may not be associated with a workflow defined in workflows 270. The interfaces 281 and 282 may include a local or remote network interface, and may also include network and/or software driver layers for communicating with database 210. In one embodiment, interfaces 281 and 282 provide access to database 210 using SQL (Structured Query Language).

Backup system 200 may be operable to perform a backup of content managed by intranet portal 120 and stored in database 210. In particular, backup application 140 may include a backup function 142 that may communicate with database 210 via interface 283 for selecting and retrieving content for archiving. Backup function 142 may generate a schema of table and index information along with the backed up contents of a database and store the generated schema to a database copy 260 on backup medium 250 via interface 284. As used herein, "schema" refers to the data structure of a database file. It is noted that the database copy 260 may be an identical instance of a database file (not shown in FIG. 2) previously created by database 210.

In one embodiment, database copy 260 is a binary file that is sequentially accessed, using standard file I/O calls to the file system of the storage medium on which the binary file is stored. It is further noted that database copy 260 may be structured in block units of memory, also referred to as pages or allocation units. The schema may then be used to access or restore the contents of database copy 260, without using database 210. Backup medium 250 represents any of a variety of storage media including removable media, network attached storage, etc. (or any other type of archive storage). In various embodiments, interfaces 283 and 284 may include a network connection along with the necessary network and software drivers, as previously mentioned.

Additionally, backup application 140 may include a restore function 144 that can read specific documents from database copy 260 via interface 291 and add them to file system 220 via interface 292. Various embodiments of methods for restoring documents from a database file are described in a U.S. patent application Ser. No. 11/551,018, entitled "METHOD FOR RESTORING DOCUMENTS FROM A DATABASE FILE," the entirety of which is incorporated herein by reference. The restore function may also include a means for selecting one or more documents for restoration. In one embodiment, a user interface for selecting and restoring documents is provided with the restore function 144 as described further below. In addition, the selected documents may have associated workflows. Further, the user interface may allow a document to be selected without its associated workflow, a document to be selected with its associated workflow, a workflow to be selected alone to be associated with a document previously restored, or otherwise.

In various embodiments, backup system 200 is further operable to direct specific documents that have been restored to file system 220 either to database 210 via interface 293 or to application 130 via interface 294 according to a process that is described further below. Backup application 140 may also be configured to provide other known archiving functionality, as desired, such as various features provided by the Enterprise Vault™ or Backup Exec™ products from Veritas.

Figure 4:
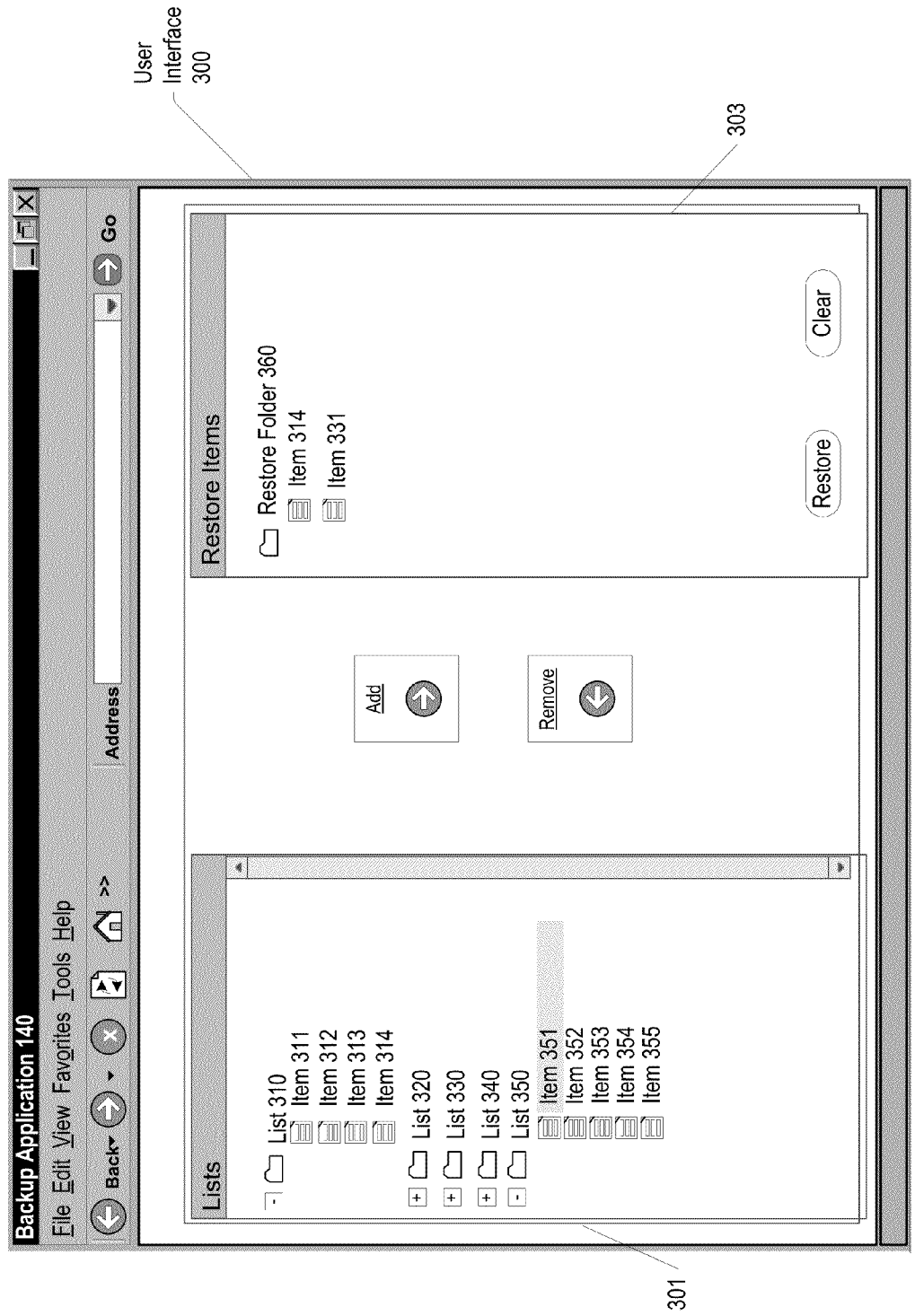
FIG. 4 illustrates one embodiment of user interface that may be presented by a backup application for selecting specific lists or items to be restored.

Turning now to FIG. 4, one embodiment of user interface 300 that may be presented by backup application 140 for selecting specific lists or items to be restored is illustrated. Interface 300 may include features such as drop-down menus, a navigation bar, an address field, and so on. Within interface 300 are shown a "Lists" pane 301 and a "Restore Items" pane 303. Each of the panes, buttons, and functionalities described here regarding lists and items may also apply to workflows.

Within Lists pane 301, a hierarchy of lists and items may be seen and navigated. The illustrated hierarchy includes lists 310, 320, 330, 340, and 350. List 310 includes items 311-314. List 350 includes items 351-355. Lists and items may be selected as indicated by a highlighted background and added to Restore Items pane 303 via an Add button. Restore Items pane 303 includes a restore folder 360 that includes items 314 and 351 to be restored. Lists and items may be selected and removed from Restore Items pane 303 via a Remove button. Restore Items pane 303 also includes a Restore button and a Clear button. Once a set of restore items has been selected, restoration may proceed. If the Restore button is selected, the items listed in Restore Items pane 303 may be added to a file system where they may be accessed by various applications. If the Clear button is selected, the items listed in the Restore Items pane are removed from the pane.

It is noted that the naming conventions depicted in FIG. 4 (e.g., "List 310", "Item 311", etc.) are provided for ease of discussion. In a typical embodiment, names reflective of those used in ordinary business or other environments (e.g., Documents, Spreadsheets, Tasks, Discussion Topics, as well as user-defined list and/or items names, etc.) may be used, as desired. Once a set of items and/or lists has been selected to be restored to the file system, restore function 144 may perform retrieval and formatting operations that enable various applications to access the retrieved lists/items.

Figure 5:
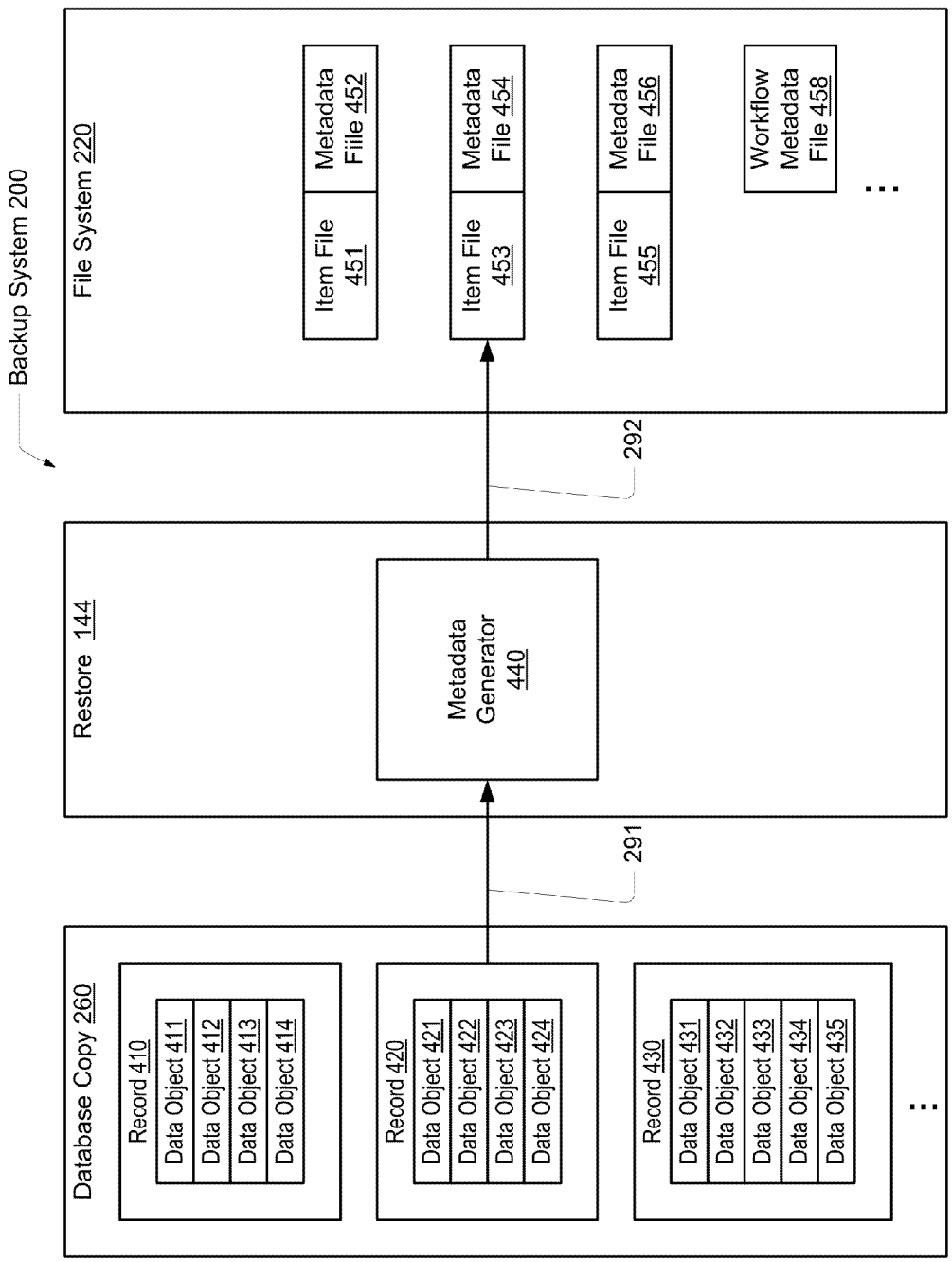
FIG. 5 illustrates one embodiment of a generalized block diagram of a restore function operation.

Referring now to FIG. 5, one embodiment of a restore function 144 operation is shown. In the illustrated embodiment, restore function 144 includes a metadata generator 440 that is coupled to and operable to retrieve records from database copy 260 via interface 291. Metadata generator 440 is further coupled to and operable to store files within file system 220 via interface 292.

In the example shown, database copy 260 includes records 410, 420, and 430 that represent any number of stored database records. Each record may include one or more data objects. In the example shown, record 410 includes data objects 411-414, record 420 includes data objects 421-424, and record 430 includes data objects 431-435. For each item that it stores in file system 220, metadata generator 440 may store an item file and a corresponding metadata file. For example, in the illustrated example, file system 220 includes item files 451, 453, and 455, associated metadata files 452, 454, and 456, and workflow metadata file 458. It is noted for a record corresponding to attributes or a history of a given workflow, a stored data object may not include an item and associated attributes, but may include information such as conditions, actions, or logged history corresponding to an item stored in another record. For each such data object stored in a record in database copy 260, metadata generator 440 may store a corresponding workflow file 458. Workflow file 458 may be associated with one or more item files 451, 453, and 455.

In one embodiment, database copy 260 may be partitioned to store data into tables, such as a document table, a list table, a workflow attributes table, a workflow history table, or otherwise. In one embodiment, each table may comprise a plurality of records. In one example, each record may be conceptually organized as a row, or entry, within a table. Each record, or row, may comprise a plurality of columns or fields or data objects. In one embodiment, each record may comprise one or more fields, wherein a field may store content of an electronic document, a first identifier that links the document to a particular list, a second identifier that links the document to a particular workflow, a third identifier that links the record to another particular record to completely describe the document, and status information such as a document name, an author name, a pathname, a date and time stamp, a site name, a version number, or otherwise.

When the user conveys a request for an item to restore, such as through the GUI as shown in FIG. 4, a particular identifier may be chosen or generated that identifies a chosen document. This identifier may be combined with other information to form a key. Examples of other information used to form a key may include at least one or more of the following: the document name, the pathname, the date and time stamp, and the site name. The date and time stamp, or simply a timestamp or simply a date, may correspond to a requested point-in-time that the user wishes to retrieve data from. This key may be used to query, or index, the document table in order to locate the one or more records corresponding to the requested document.

In the document table, within a record with one or more fields combined that form a value that matches the key, another field within this record may store the second identifier that links the record to a particular workflow. Therefore, a document with content stored in this record within the document table is linked, or associated, to this particular workflow. This second identifier may be combined with other information or used alone to form a key to query, or index, the workflow attributes table. In one embodiment, a first key used to query the document table and a second key used to query both the workflow attributes table and the workflow history table may utilize a same date and time stamp. Therefore, in the database copy 260, stored records corresponding to a document and associated workflow attributes and history are associated to a same date and time requested by the user for the restore.

In the workflow attributes table, within a record with one or more fields combined that form a value that matches the above described key, a stored sequence of conditions and actions correspond to the document. Also, this same key may be used to query, or index, the workflow history table. In the workflow history table, within a record with one or more fields combined that form a value that matches this key, a stored history log provides state information corresponding to the key-matching workflow attributes.

It is noted the date and time stamp may correspond to a user-specified stop-point chosen through the GUI of FIG. 4. For example, a user may wish to restore a version of a document with an associated workflow from last week. The date and time stamp, in addition to other information combined to form a key, may create a key that matches stored values in one or more records in the document table that correspond to the requested document of last week. Alternatively, the created key may match one record in the document table that corresponds to the requested document of last week, and this one record stores an identifier in a known location, or field, that links this one record to another record corresponding to the requested document. This second record may also store an identifier in a known location that links it to a third record corresponding to the requested document, and so forth. Further, the date and time stamp may be used to create a key to query the workflow attributes table and the workflow history table.

In one example, the sequence corresponding to a flowchart of the workflow may not have changed in the past week. However, the state of the workflow may have changed, such as the corresponding document has been reviewed and rejected, and, therefore, traversed from a first step to a second step of a flowchart corresponding to the workflow. This state change may be tracked in a corresponding history log. Therefore, the version of the document this week may correspond to the second step following the first step, wherein the second step is reached by the review and resulting rejection. The version of the document of last week may correspond to the first step prior to the review and rejection. A record within the workflow history table that has one or more fields combined to form a value that matches a key with the date and time stamp of last week may store the corresponding history log of last week for the requested restore operation. This record may store an identifier that links this record to other records used to store information corresponding to this particular history log.

As further described later, the above records that are stored in the database copy 260 may be used to generate a corresponding workflow metadata file. This generated workflow metadata file may be used to update one or more files corresponding to the requested workflow to be restored. In the above example, a corresponding history log of a week ago may contain less records than a current history log. In one embodiment, a corresponding location in file system 220 is empty, and the generated workflow metadata file is used to store or create files directly in this location. For example, the user may have removed any copies of a requested item and workflow prior to a requested restore operation. In another embodiment, the user did not remove corresponding files, and during the restore operation, these files may be updated.

During a restore operation of the above example, wherein corresponding files already exist and the workflow of a week ago may have less records than a corresponding current workflow (e.g. a workflow of a week ago may have a record corresponding to the first step and a current workflow may have a record corresponding to the first step and another record corresponding to the second step), then the records that may be found in both workflows (e.g. the record corresponding to the first step) may be updated to now include matching information in the record stored in database copy 260. In this case, the record corresponding to the first step and other corresponding files may have information updated to match information in the record of a week ago, wherein this record of a week ago is stored in database copy 260.

In addition, existing records and files in file system 220 and database 210 that correspond to the second step of the above example may be searched and subsequently removed. For example, another key based on the same information except for a different date and time stamp or no date and time stamp may be used to query and find records and files that may exist in file system 220 and database 210 that do not correspond to the requested restore stop-point.

In another example, a corresponding history log of a week ago may contain more records than a current history log. For example, a user may have accidentally removed history that the user wishes to restore. In this case, existing records and files are updated as described above and additional information stored in the generated workflow metadata file may be used to generate new records and files in the file system 220 and database 210.

In a third example, the sequence corresponding to a flowchart of the workflow may have changed in the past week. A reviewer may have left the company. Now, in this example, the names of the one or more reviewers that correspond to the reached second step of the flowchart of the workflow have changed. After the review and rejection following the first step of the flowchart, a slightly different second step now exists. In another example, this second step may have greater changes or be removed or be completely replaced by a third step. In one embodiment, such a modified workflow may have records stored in database copy 260 that include a different identifier, and, therefore, these records correspond to a different workflow. The corresponding document may have its stored identifier updated to point, or be linked, to this new workflow, which is the modified older workflow.

In another embodiment, such a modified workflow may have records stored in database copy 260 that include the same identifier as before, but the stored date and time stamp is different. In either case, a key formed by the identifier, the date and time stamp, and other information may mismatch on the records of the current workflow that is modified. This same key may match on the records of the workflow of last week due to the matching date and time stamp of last week.

Similar to the above description, existing files and records in file system 220 and database 210 may be updated based on the information in the generated workflow metadata file. Missing files and records in file system 220 and database 210 may be created using the information in the generated workflow metadata file. Additional files and records in file system 220 and database 210 may be removed based on information in the generated workflow metadata file.

In one embodiment, metadata files 452, 454, and 456 and workflow metadata file 458 generated by metadata generator 440 may be formatted in Collaborative Application Markup Language (CAML). CAML, as used herein, refers to an XML (Extensible Markup Language)-based markup language that includes specific groups of tags that may be used by intranet portal applications to both define and display data objects. More particularly, during operation, metadata generator 440 may use interface 291 to retrieve a record that corresponds to a requested item, identifying attributes of the item that are also stored in the record. Metadata generator 440 may extract the item from the record and generate an item file comprising the item stored in a raw or well-known file format that may be commonly understood by various software programs such as a .txt text file, a .jpg or .gif image file, etc.

In addition, metadata generator 440 may generate an associated CAML element with appropriate tags for each item attribute that is found. In one embodiment, an item may have a single tag associating the item to a particular list. Metadata generator 440 may store the tagged attributes in a metadata file that is associated with the item file. Similarly, during operation, metadata generator 440 may use interface 291 to retrieve a record that corresponds to a workflow associated with one or more items stored in other records. Metadata generator 440 may identify attributes of the workflow that are also stored in the retrieved record. It is noted that the metadata generator 440 may perform more operations to generate an associated element with appropriate tags for a record corresponding to a workflow than for a record corresponding to an item. The attributes of a workflow may include conditions, events, actions, and history information. Metadata generator 440 may generate an associated CAML element with appropriate tags for each workflow attribute that is found. Metadata generator 440 may store the tagged attributes in a workflow metadata file that is associated with an item file. Metadata generator 440 may then use interface 292 to store the item or list and associated metadata and associated workflow metadata as associated files in file system 220.

Once an item file and an associated metadata file and an associated workflow metadata file have been stored in file system 220, they may be accessed by intranet portal application 120, application 130, or another application as follows. Since the attributes that are described in an item's associated metadata file and workflow metadata file originated from an intranet portal application, they describe the intranet portal environment sufficiently to enable restoration of the item to a similar environment in an intranet portal. Thus, intranet portal 120 may retrieve items from file system 220 via interface 293 including accessing an item's associated metadata file to retrieve sufficient environmental information to restore the item to the intranet portal environment.

Alternatively, another application such as application 130 may ignore an item's associated metadata file and workflow metadata file and access the item file directly via interface 294 in a raw or well-known file format. Accordingly, by providing an item file for each item, various types of items may be redirected from there original environment in a copy of a database used by an intranet portal to any other application environment that can access files in a file system.

Figure 6:
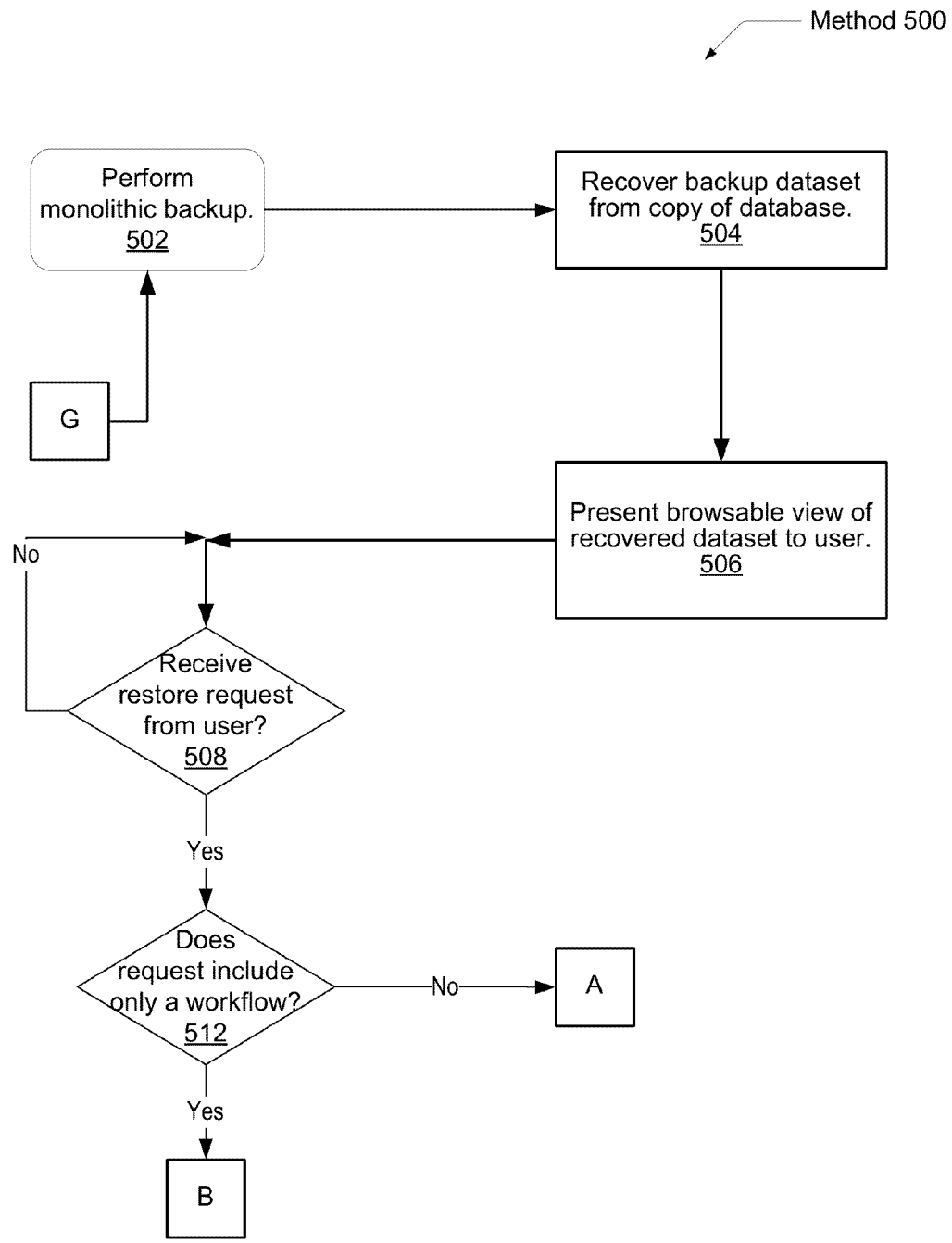
FIG. 6 illustrates one embodiment of a flow diagram for restoring item and workflow attributes from a monolithic backup process.

Referring to FIG. 6, one embodiment of a method 500 for restoring item and workflow attributes from a monolithic backup is shown. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a monolithic backup of content is performed, wherein, in one embodiment, the content is managed by intranet portal 120 and stored in database 210. A schema of table and index information along with the backed-up contents of a database may be generated and stored as described above regarding backup application 140 and backup function 142 of FIG. 2 and data storage using tables and records within database copy 260 of FIG. 5.

In block 504, recovery of a backup dataset from a copy of a database may be performed. For example, a dataset that has been stored as a backup copy of a database used by an intranet portal application to store lists and items may be recovered to a temporary location. In block 506, a user may then be presented with a browsable view of the recovered dataset, such as the graphical user interface illustrated in FIG. 4. A user may browse the view of the recovered dataset and select items to be restored.

In conditional block 508, a request to restore the user's selected items and/or workflows may be received. Identification of a selected item and/or workflow in a recovered dataset may be performed by a GUI as illustrated in FIG. 4. In addition, the GUI may be used to identify a date and time stamp of the selected item and/or workflow. Additional status information may be identified corresponding to the request such as a document name, a workflow name, an author name, a pathname, a site name, a version number, or otherwise. This information may be later used to form a key for querying tables within database copy 260. If the request includes one or more workflows, but no items (conditional block 512), then control flow of method 500 moves to block B. Otherwise, control flow of method 500 moves to block A.

Figure 7:
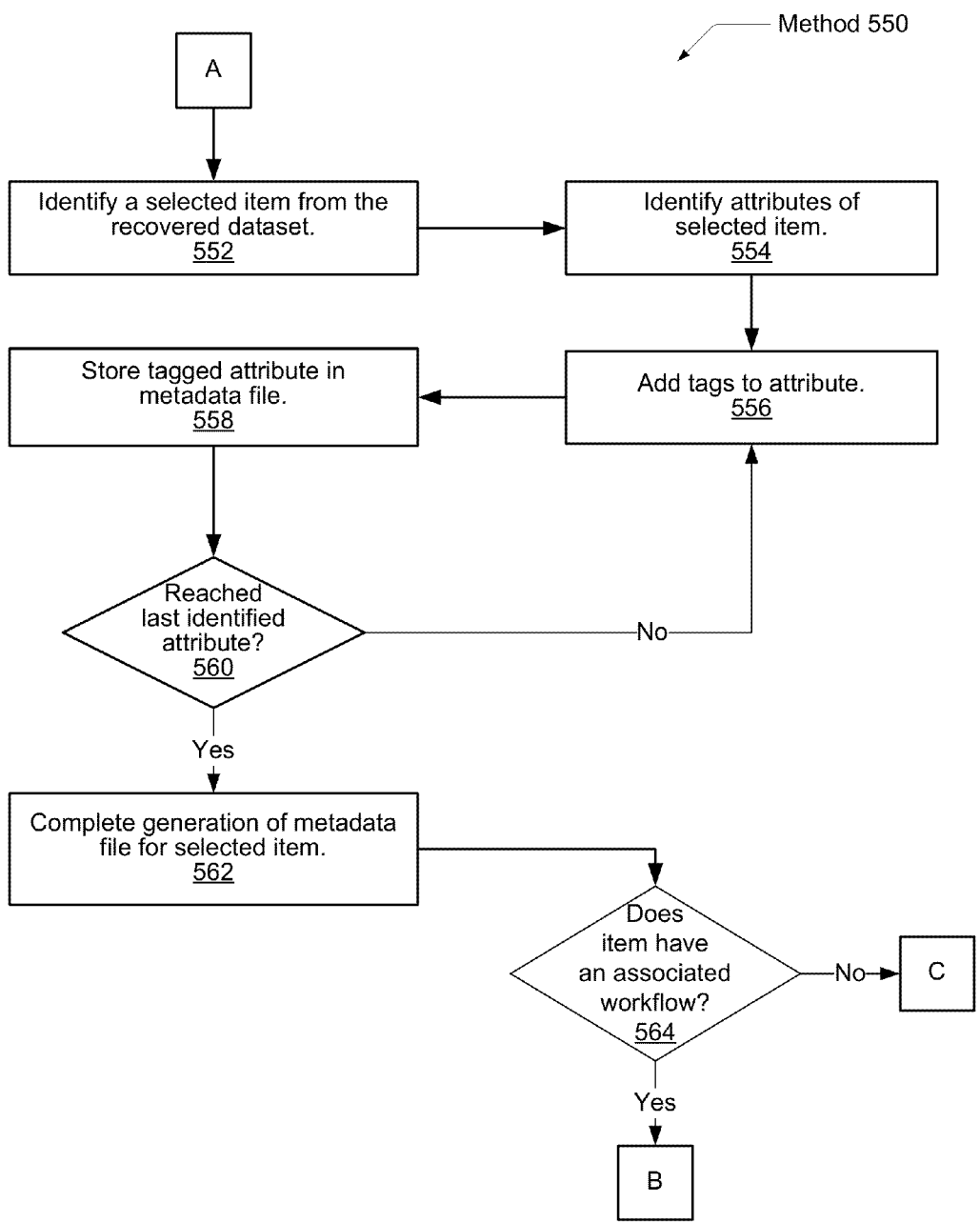
FIG. 7 illustrates one embodiment of a flow diagram for continuing restoring item and workflow attributes from a monolithic backup process.

Turning now to FIG. 7, one embodiment of a method 550 for continuing restoring item and workflow attributes from a monolithic backup is shown. Similar to each described method, the components embodied in the computer system described above may generally operate in accordance with method 550. For purposes of discussion, the steps in this embodiment are shown in sequential order. However, some steps may occur in a different order than shown, some steps may be performed concurrently, some steps may be combined with other steps, and some steps may be absent in another embodiment.

In order to arrive at block A, a user request for a restore includes at least one item. In one embodiment, prior to generating a metadata file for an item stored in a backup copy of a database used by an intranet portal application, a selected item may be identified in a recovered dataset in block 552. A software tool with a GUI as shown in FIG. 4 may be used. As described above regarding database copy 260 of FIG. 5, when the user conveys a request for an item to restore, such as through the GUI as shown in FIG. 4, a particular identifier may be chosen or generated that identifies a chosen document. This identifier may be combined with other information to form a key. This key may be used to query, or index, a document table in database copy 260 in order to locate the one or more records corresponding to the requested document, or item.

Once an item has been identified, in block 554, a raw file form of the requested item may be reconstructed from the backup dataset using a well-known file format. In one embodiment, the well-known format files may be referred to as item files. In one embodiment, metadata generator 440 may extract the item from one or more records that matched a key during a query of a document table and generate an item file comprising the item stored in a raw or well-known file format. Examples of file formats may include a .txt text file, a .doc file, a .jpg or .gif image file, etc.

Also, in block 554, the schema of the requested item in the recovered dataset may be examined to identify associated attributes of the item. For example, a corresponding record in a document table may comprise a plurality of fields, or data objects. These fields may store attributes of the item. For each attribute, a tag may be added to the attribute in block 556. In block 558, the tagged attribute may be stored in a metadata file associated with the item.

Once all the identified item attributes have been tagged and added to the metadata file (decision block 560), in block 562, the generated metadata file that includes a tagged entry for each attribute may be stored in the recovered dataset and associated with the selected item. The metadata file describes the items in the database schema from which the backup copy was taken. For example, the schema may describe the item in the environment of the intranet portal application. Next, both the item file and the associated metadata file may then be stored in the file system. The corresponding steps are described below after a determination of whether the requested item has an associated workflow.

In one embodiment, a determination of whether the requested item has an associated workflow may include inspecting a predetermined field within a corresponding record within a document table. If the field has a valid identifier (ID) value, then this value may be used to form a key for use in querying a workflow attributes table within database copy 260. If the item has an associated workflow (conditional block 564), then control flow of method 550 moves to block B. Otherwise, control flow of method 550 moves to block C.

Figure 8:
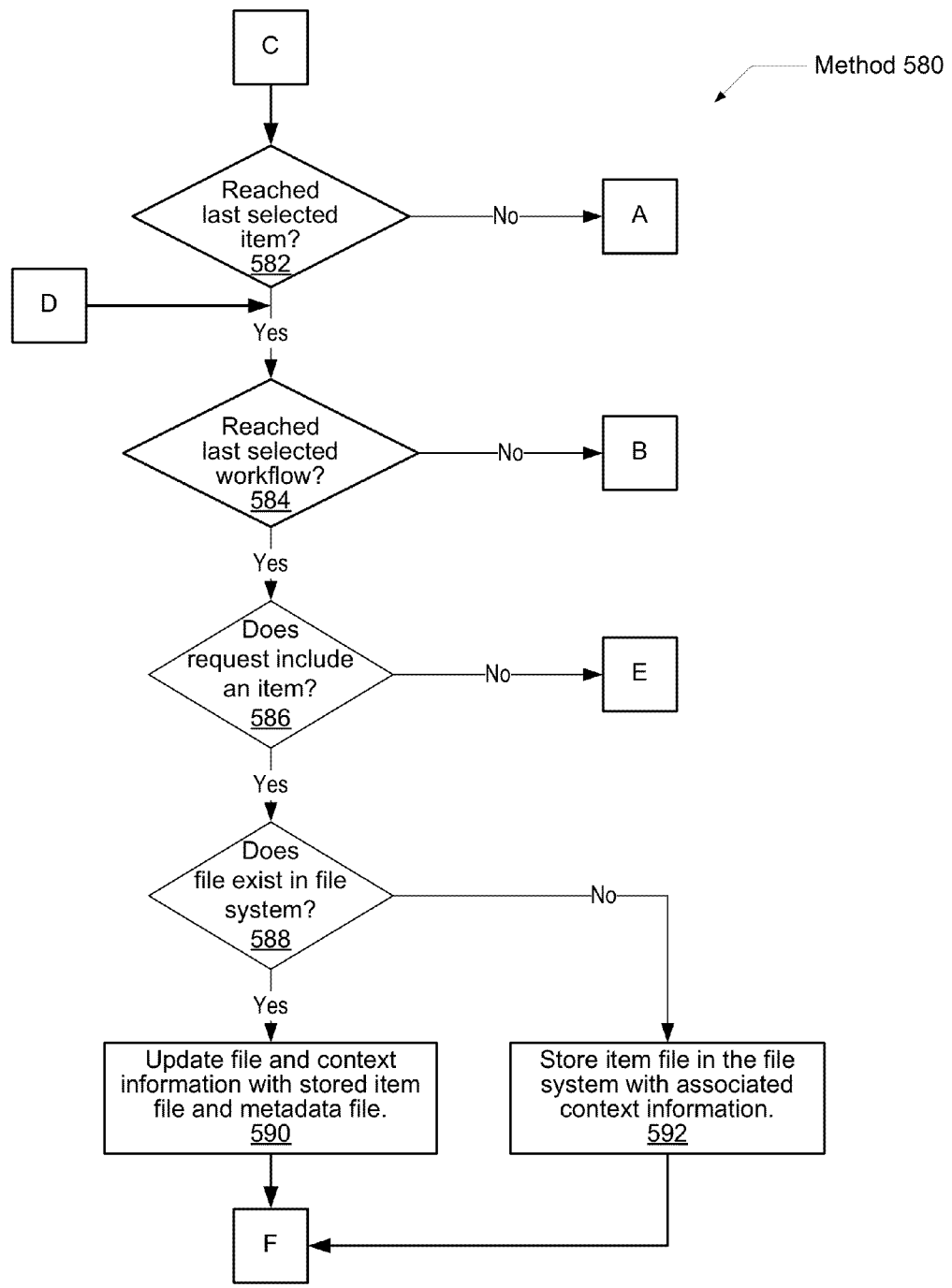
FIG. 8 illustrates one embodiment of a flow diagram for continuing restoring item and workflow attributes from a monolithic backup process.

Referring now to FIG. 8, one embodiment of a method 580 for continuing restoring item and workflow attributes from a monolithic backup is shown. In order to arrive at block C, item files and corresponding metadata files of selected items may be ready to be stored in a file system. Also, workflow metadata files generated from workflows that have been selected or have been determined to be associated with selected items may be ready to be stored in a file system. Once item files and metadata files have been created for each selected item (decision block 582), and any necessary workflow metadata files have been created (conditional block 584), then these files may be used to restore requested data. These files may be used to update files already stored in file system 220 or may be used to provide new information in file system 220 by being stored in file system 220. A description of various embodiments of these steps follows below.

If the received request from the user includes an item (conditional block 586), and a corresponding file for the item already exists in the file system 220 (conditional block 588), then in block 590, the existing file may be updated. The existing file may reside under a predetermined pathname with a filename, wherein both the pathname and filename may be used to identify the item. The content of the file may be updated using the generated item file. In addition the context information may be updated using the generated metadata file. Context information that may be updated may include author, version number, date and time stamp, an identifier used to link to a workflow, and otherwise. Pointers to the file may remain unchanged. If the corresponding file for the item does not already exist in the file system (conditional block 588), then in block 592, the entire generated item file may be stored in file system 220 and associated context information including pointer fields may be derived from the generated metadata file.

Typically, the request is a request to restore one or more items to the environment of the intranet portal application. The information in the metadata file associated with each item file may be used to restore the item to the intranet portal application environment, such as updating the corresponding context information as discussed above. It is noted that the metadata file information may use a standard markup language format that is well-know to intranet portal applications, such as CAML, so that the metadata file information may be alternatively used to enter the item as a new item in a different intranet portal application environment or the environment of a different instance of the same intranet portal application.

In addition, if the request is not a request to restore items to the environment of the intranet portal application, then an item may be re-directed for use by another application that has access to the file system and therefore to item files in raw or well-known file format. After the file system is updated with the generated item file and metadata file, control flow of method 580 then moves to block F.

Figure 9:
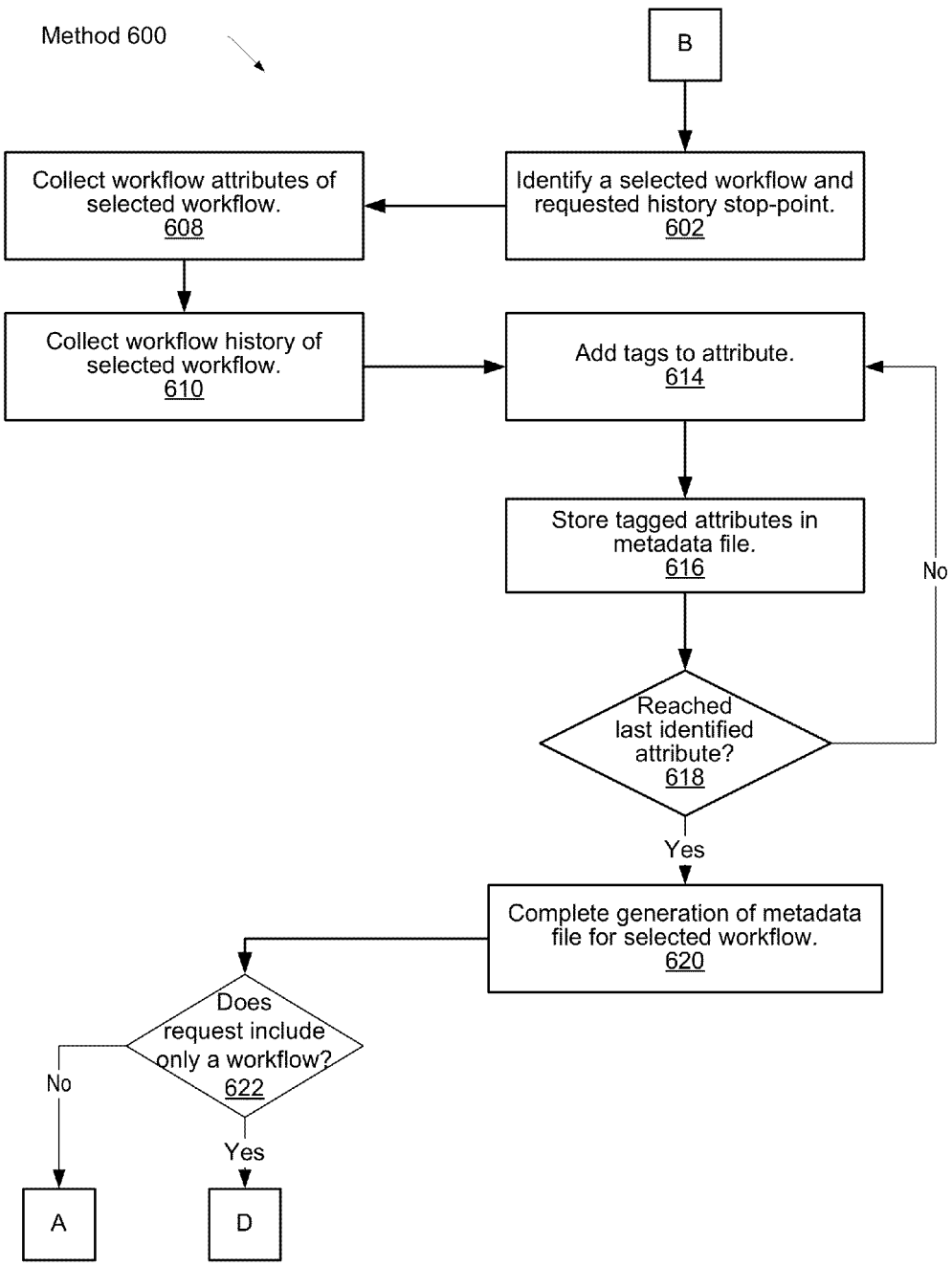
FIG. 9 illustrates one embodiment of a flow diagram for continuing restoring item and workflow attributes from a monolithic backup process.

Referring now to FIG. 9, one embodiment of a method 600 for continuing restoring item and workflow attributes from a monolithic backup is shown. In order to arrive at block B, a user request for a restore does include a workflow. In one embodiment, the user, through the use of the GUI of FIG. 4, may have requested only an item, but it may be determined later that the item has an associated workflow. In this embodiment, the requested item may be associated with stored information that associates the requested item to a particular workflow. As described above regarding database copy 260 of FIG. 5, in a document table in database copy 260, a record may comprise one or more fields combined that form a value that matches a key associated with the user's request. Another field within this record may store an identifier that links the record to a particular workflow. Therefore, a document with content stored in this record within the document table is linked, or associated, to this particular workflow. This identifier may be combined with other information or used alone to form another key to query, or index, a workflow attributes table within database copy 260.

In another embodiment, the user may have requested both an item and a corresponding workflow. The item may have two or more associated workflows and the user may request a particular number of workflows less than the total number of available workflows. For each requested workflow, in one embodiment, a unique identifier may be identified by a corresponding request such as through the GUI of FIG. 4. Similar to the above embodiment, each identifier may be combined with other information or used alone to form a key to query, or index, the workflow attributes table. In another embodiment, two or more workflows may have a same identifier, since they are different versions of a same original workflow, but the combination with other information, such as a date and time stamp, author, or other, may make a corresponding key unique.

In yet another embodiment, the user may have requested one or more workflows, but no items. The user may wish to associate restored versions of these requested workflows with one or more items that have already been earlier restored. Similar to the above example, each identifier corresponding to a requested workflow may be combined with other information or used alone to form a key to query, or index, the workflow attributes table.

Both an item and a workflow may be restored at the same time. Therefore, methods 550 and 600 may occur simultaneously as previously noted. In one embodiment, prior to generating a metadata file for a workflow stored in a backup copy of a database, a selected workflow may be identified in a recovered dataset in block 602.

Although one or more items may have passed a given point in a workflow, a user may wish to view documents or items at a prior point in the workflow. For example, a workflow may have two or more approval decision blocks similar to decision block 708 of flow chart 700 of FIG. 3. Although several items may have an approved status for two or more of these decision blocks, or stages, a user may wish to restore only a portion of a workflow that includes a first decision block, or approval stage. The previously indicated history stop-point may be used to determine at which stage to end restoration for the history. In one embodiment, a date and time stamp may be used to indicate such a stop-point.

Once a workflow has been identified, in block 608, its schema in the recovered dataset may be examined to identify associated attributes of the workflow. As described earlier regarding attributes 272 of FIG. 2, these attributes may be numerous and be associated with schema action and condition elements. In one embodiment, a tag identifier (ID) may be supplied by the user, such as via a GUI, or read from an associated document or item. Alternatively, a tag ID may be associated with a user-requested document or item, and the tag ID value may be read from this source. This tag ID may be used to index a corresponding table, such as a workflow attributes table, to find corresponding records storing the attributes within this table. In one embodiment, only the matching records within a table may be restored, rather than restoring the entire table.

In block 610, the same schema in the recovered dataset may be examined to identify an associated history of the workflow. The user-indicated history stop-point, or point-in-time, such as a date and time stamp, may be used. In one embodiment, the same tag ID may be used to index a corresponding table, such as a workflow history table, to find a corresponding record storing the history information within this table. For each attribute and history record, a tag may be added to the attribute and history in block 614. In block 616, the tagged attributes may be stored in a workflow metadata file associated with the workflow.

Once all the identified workflow attributes have been tagged and added to the workflow metadata file (decision block 618), in block 620, the generated workflow metadata file that includes a tagged entry for each workflow attribute may be stored in the recovered dataset and associated with the selected workflow. This selected workflow may be associated with a selected item. The workflow metadata file describes the workflow attributes, such as conditions and actions, and workflow history, such as a state of the workflow, in the database schema from which the backup copy was taken. For example, the schema may describe the workflow in the environment of the intranet portal application. Next, both the workflow metadata file, in addition to any item files and associated metadata files, may then be stored in the file system. The corresponding steps are described below. First, if the user request includes only one or more workflows, but no items (conditional block 622), then control flow of method 600 moves to block D. Otherwise, control flow of method 600 moves to block A.

Figure 10:
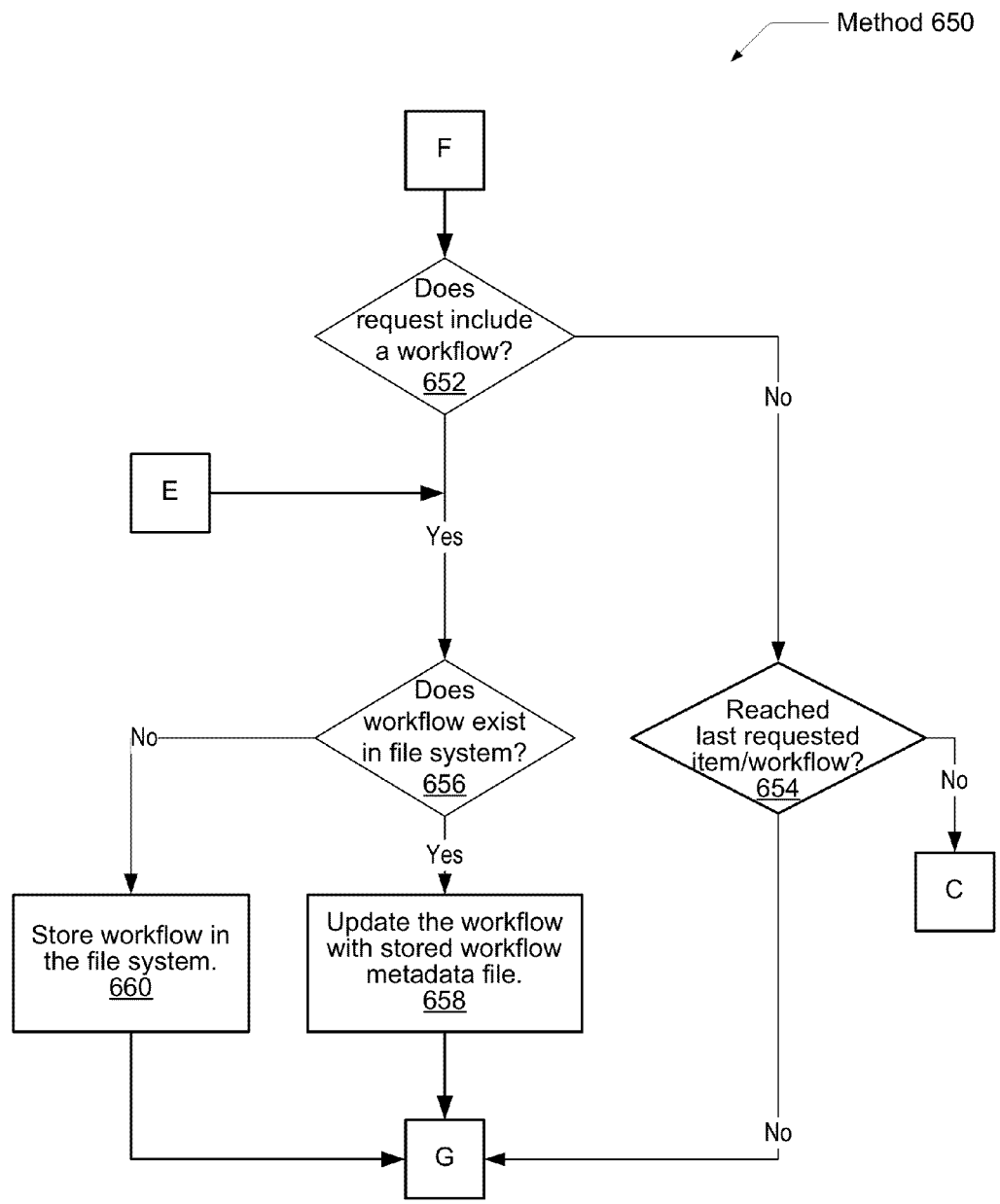
FIG. 10 illustrates one embodiment of a flow diagram for continuing restoring item and workflow attributes from a monolithic backup process.

Turning now to FIG. 10, one embodiment of a method 650 for continuing restoring item and workflow attributes from a monolithic backup is shown. Similar to each described method, the components embodied in the computer system described above may generally operate in accordance with method 650. For purposes of discussion, the steps in this embodiment are shown in sequential order. However, some steps may occur in a different order than shown, some steps may be performed concurrently, some steps may be combined with other steps, and some steps may be absent in another embodiment.

In order to arrive at block F, a user request for a restore includes an item, such as an electronic document, and the corresponding file has been updated or instantiated by the generated item file and metadata file. If the request does not include a workflow (conditional block 652), and there are no more requested items or workflows to restore (conditional block 654), then control flow of method 650 moves to block C and returns to method 580. If there are more requested items or workflows to restore (conditional block 654), then control flow of method 650 moves to block G and returns to method 500.

If the request for an item also includes a workflow (conditional block 652), either directly by the user or indirectly by association with the requested item, then the generated workflow metadata file may be used to update workflow files already stored in file system 220 or may be used to provide new information in file system 220 by being stored in file system 220. These steps are described next, but, first, in order to arrive at block E, the user did not request to restore an item. Therefore, the user may have requested to restore a workflow.

If a corresponding workflow does not already exist in the file system (conditional block 656), then in block 660, the entire generated workflow metadata file may be stored in file system 220. If a corresponding workflow already exists in the file system 220 (conditional block 656), then in block 658, the existing workflow may be updated. As discussed above, a workflow may have corresponding attributes, such as a sequence of conditions and actions, and a history log that supplies a state of the workflow. The existing workflow may reside under one or more predetermined pathnames with corresponding filenames, wherein both the pathname and filename may be used to identify the workflow. Two or more pathnames and filenames may be used since the workflow consists of both attributes and history.

The content of the corresponding files may be updated using the generated workflow metadata file. Other information that may be updated may include author, version number, date and time stamp, identifiers used to link corresponding records, and otherwise. Pointers to the file may remain unchanged, since the location has not changed. The update, creation, and removal of files and records in file system 220 and database 210 based on the information in a corresponding generated workflow metadata file may be performed as described above regarding the description of the backup system 200 of FIG. 5. Following, control flow of method 650 moves to block G and returns to method 500.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
    performing a backup of a database file by generating a schema of table and index information along with backup contents of the database file and storing the generated schema in association with a backup copy of the database file;
    receiving a request to restore a workflow from an unmounted backup copy of a database file, wherein the backup copy of the database file is a single monolithic database file;
    responsive to receiving the request to restore the workflow from the unmounted backup copy of the database file:
        locating a workflow attributes table;
        retrieving one or more records comprising attributes of the workflow from the backup copy of the database file, wherein the one or more records are retrieved without mounting the backup copy of the database file and wherein the schema is used to identify and retrieve the workflow without accessing a mounted database file; and
        restoring the workflow to a file system without restoring the backup copy of the database file.

2. The method as recited in claim 1, wherein the backup copy of the database file comprises a plurality of tables, and wherein the plurality of tables includes a workflow attributes table and a workflow history table.

3. The method as recited in claim 2, further comprising:
    generating a first key to identify the workflow of the restore request;
    locating a first value in a first record stored in a first table, wherein the first value matches the first key;
    using the first value to query the workflow attributes table to locate one or more second records corresponding to the workflow; and
    using the first value to query the workflow history table to locate one or more third records corresponding to the workflow.

4. The method as recited in claim 1, further comprising:
    using the one or more second records and one or more third records to generate a workflow metadata file; and
    using the workflow metadata file to update one or more files corresponding to the workflow.

5. The method as recited in claim 3, wherein the first table is a document table.

6. A computer system comprising:
    a processor; and
    a memory storing program instructions executable by the processor to:
        perform a backup of a database file by generating a schema of table and index information along with backup contents of the database file and storing the generated schema in association with the backup copy of the database file;
        receive a request to restore a workflow from an unmounted backup copy of a database file, wherein the backup copy of the database file is a single monolithic database file;
        responsive to receiving the request to restore the workflow from the unmounted backup copy of the database file:
            locate a workflow attributes table;
            retrieve one or more records comprising attributes of the workflow from the backup copy of the database file, wherein the one or more records are retrieved without mounting the backup copy of the database file and wherein the schema is used to identify and retrieve the workflow without accessing a mounted database file; and
            restore the workflow to a file system without restoring the backup copy of the database file.

7. The computer system of claim 6, wherein the backup copy of the database file comprises a plurality of tables, and wherein the plurality of tables includes a workflow attributes table and a workflow history table.

8. The computer system of claim 7, wherein the program instructions are further executable to:
    generate a first key to identify the workflow of the restore request;
    locate a first value in a first record stored in a first table, wherein the first value matches the first key;
    use the first value to query the workflow attributes table to locate one or more second records corresponding to the workflow; and
    use the first value to query the workflow history table to locate one or more third records corresponding to the workflow.

9. The computer system of claim 6, wherein the program instructions are further executable to:
    use the one or more second records and one or more third records to generate a workflow metadata file; and
    use the workflow metadata file to update one or more files corresponding to the workflow.

10. The computer system of claim 8, wherein the first table is a document table.

11. A non-transitory computer-readable storage medium storing program instructions that are executable to:
    perform a backup of a database file by generating a schema of table and index information along with backup contents of a database file and storing the generated schema in association with the backup copy of the database file;
    receive a request to restore a workflow from an unmounted backup copy of a database file, wherein the backup copy of the database file is a single monolithic database file;
    responsive to receiving the request to restore the workflow from the unmounted backup copy of the database file:
        locate a workflow attributes table;
        retrieve one or more records comprising attributes of the workflow from the backup copy of the database file, wherein the one or more records are retrieved without mounting the backup copy of the database file and wherein the schema is used to identify and retrieve the workflow without accessing a mounted database file; and
        restore the workflow to a file system without restoring the backup copy of the database file.

12. The non-transitory computer-readable storage medium of claim 11, wherein the backup copy of the database file comprises a plurality of tables, and wherein the plurality of tables includes a workflow attributes table and a workflow history table.

* * * * *